United States Patent [19]

Barchard

[11] 4,395,190

[45] Jun. 26, 1983

[54] POWER OPERATED EXTENSIONS FOR FORKS OF A FORK LIFT TRUCK

[75] Inventor: John Barchard, Crystal Lake, Ill.

[73] Assignee: Spyder Sales & Service, Inc., Needville, Tex.

[21] Appl. No.: 240,121

[22] Filed: Mar. 3, 1981

[51] Int. Cl.³ .................................... B60P 1/46

[52] U.S. Cl. .................................... 414/664; 414/785; 414/417; 414/661

[58] Field of Search ............... 414/495, 497, 659, 661, 414/663, 664, 668, 785, 607

[56] References Cited

U.S. PATENT DOCUMENTS

| | | | |
|---|---|---|---|
| 2,536,068 | 1/1951 | Lehmann | 214/113 |
| 2,973,879 | 3/1961 | Gibson | 214/730 |
| 3,416,686 | 12/1968 | Penrod | 214/778 |
| 3,512,672 | 5/1970 | Carpenter | 214/730 |
| 3,549,035 | 12/1970 | Soper | 214/750 |
| 3,561,628 | 2/1971 | Melin | 214/731 |
| 3,826,393 | 3/1973 | Carroll | 214/674 |
| 3,908,849 | 9/1975 | Carroll | 214/672 |
| 4,268,210 | 5/1981 | Ferguson et al. | 414/661 X |

*Primary Examiner*—Robert G. Sheridan
*Attorney, Agent, or Firm*—Kenneth T. Snow

[57] ABSTRACT

Each of the tines of a fork lift truck is provided with a sleeve which is telescopically slidable thereover. A cross member joins the sleeves at their inner ends closest to the truck. A mechanical linkage is mounted on the truck and attached to the cross member. Extension of the linkage causes the covering sleeves to be tine extensions thus permitting a load carried thereon to be forwardly extended relative to the lift truck. A bail member having a rectangular perimeter is pivotally mounted at its rear on the lift truck to the rear of the tines and is positionable either in a substantially vertical position adjacent the front of the lift truck or in a horizontal position where the front cross member rests on the top surface of the sleeves. A cross slatted pallet carrying a load is positioned across the forwardly extending tines with their sleeve covers. Each of the sleeves is provided with a fixed lug on its top side. The lugs, transversely aligned, are adapted to engage one of the pallet cross slats and thus fix the pallet with respect to the tines and their sleeve covers. The forward end or cross member of the bail in its horizontal position acts in effect as a pusher of the load to thereupon strip the load of the pallet from the pallet when the extended sleeves are retracted.

1 Claim, 6 Drawing Figures

POWER OPERATED EXTENSIONS FOR FORKS OF A FORK LIFT TRUCK

BACKGROUND OF THE INVENTION

1. Field of the Invention

Elongated extensions have long been available for mounting over the regular forks or tines of lift trucks. These have been used to give a further reach to the lift truck. However, such extensions have been troublesome to use and most require much additional manual labor. The present invention contemplates the permanent installment of telescopic sleeve extensions on the tines of fork lift trucks and the power operating of such extensions either to a forward extended position or retracted so the sleeves are substantially coextensive with the regular tines of the lift truck. This eliminates the necessity of a manual putting on and taking off of such extension forks. More importantly this new device permits the operators of lift trucks to convert their forks from longer to shorter forks and vice-versa during operation. The extended forks may be used to reach further out for a load to be retrieved whereafter that load may then be pulled back toward the lift truck to make the truck more stable before the load is fully or entirely removed from its original resting place, and either raised or lowered.

Another feature of the invention is to provide for the stripping of the load from a pallet. For example, many goods or products are often mounted on pallets and then loaded on truck beds. When the truck reaches its destination the loaded pallets usually are then removed by lift trucks. In the past the only way to remove the goods or products from the pallets was by manually removing such goods. As a rule the synchronizing of a suitable labor force with the delivery of goods by truck is very difficult and the result in many instances is that the pallets are left at the site of the consignee. Either the pallets must be expendable or a return trip must be made to retrieve the pallets after they have been unloaded. It is the purpose of this invention to provide for the mechanical unloading or stripping of the pallets of their goods or products at the time of unloading so the pallets may be returned to the shipper immediately.

2. Description of the Prior Art

A patent search was made and the following patents were found and believed to have some bearing on the patentability of the subject device.

The U.S. Pat. No. 2,973,879 to Gibson shows fork extensions 36 and 38 joined by a cross tie member 40. These extensions are powered in or out on the regular forks 24 and 26 of a lift truck by hydraulic cylinders. The Gibson device is unusual in that in addition to having powered fork extensions it also has means for moving the entire lift assembly fore and aft by a scissors linkage. The operation of the scissors linkage in its extending direction by the cylinder 48 causes a simultaneous extension of the fork extensions 36-38-40. Conversely when the cylinder 52 is energized to cause a retraction of the extensions there is a simultaneous retraction of the scissors linkage by reason of the chains 42 which join the fork extensions with the scissors linkage. The operator does not have the ability with this mechanism to extend or retract the fork extensions without, at the same time, extending or retracting the lift mast.

The U.S. Pat. No. 3,561,628 to Melin provides for the separate hydraulic shifting of fork sleeves on the forks of a fork lift. The Melin sleeves are not the same as fork extensions but rather are means for angularly adjusting a load on the forks to permit uniform stacking of the loads lifted by the forks. Without such means it would be necessary to reposition the entire lift truck to square up a stack.

The U.S. Pat. No. 3,416,686 to Penrod shows a haystacker having fully retractable forks. The forks are extended to carry such items as hay bales and when the bales are set on top of a stack, the forks are retracted. The "aligning strips" 24, 26, 30 and 32 form a vertical face which presses against the bale and prevents the stack from being jostled while the forks are retracted.

The U.S. Pat. No. 3,512,672 to Carpenter shows power operated fork extensions on a shelf stacking crane. The forks are hinged as well as having extensions to permit the loads to reach the shelves.

The U.S. Pat. No. 3,549,035 to Soper causes a member within a wedge shaped fork to move fore and aft therein to cause roller bearing members to be raised to or retracted from the surface of the forks. A load carried by the forks will slide off the forks easily when the rollers are exposed.

The U.S. Pat. No. 2,536,068 to Lehmann shows a raisable load carrier consisting of a fixed section, a section slidable endwise thereon outwardly and inwardly and power means between the sections, controlled at the driver's station for operating the slidable section in each direction.

Although others have previously employed power extensions for the fork tines of lift trucks, no one had previously employed the simple front carried linkage of applicant to effect extension or retraction of the cross joined sleeves on the regular fork tines for reaching farther forward with the forks at the discretion of the operator and at a time during operation of the truck. Certainly no one of these prior devices contemplated the stripping of a pallet in combination with power extended sleeve extensions on the forks of a lift truck.

SUMMARY OF THE INVENTION

The principal object of the present invention is to provide a novel fork extension and retraction for a lift truck.

An important object of this invention is to provide a novel mechanical linkage for effecting the extending and withdrawing of sleeve covers for the regular fork tines of a lift truck.

Another and further important object of this invention is to provide novel sleeve extensions for the forks of a lift truck in which the sleeves are held together as a unit by a cross member, and the power means for extending and retracting the sleeves operates against the cross member.

Still another and further important object of this invention is the provision of a novel interlock between the sleeve extensions and a load carrying pallet and in combination with a removable bail-like stripper member permits the easy stripping of the pallet's load.

Other and further important objects and advantages will become apparent from the disclosures in the following specification and accompanying drawings.

IN THE DRAWINGS

AS SHOWN IN THE DRAWINGS

Figure 1:
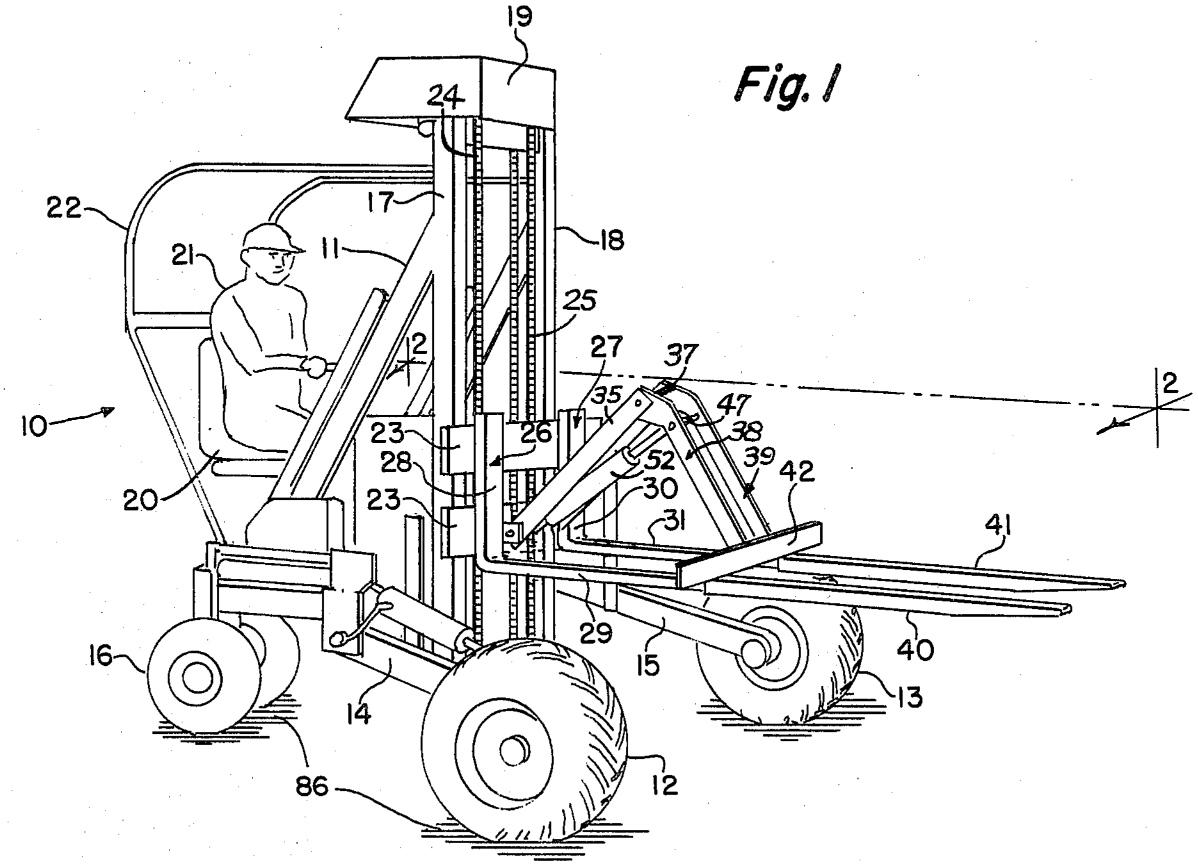
FIG. 1 is a perspective view of a lift truck having the powered fork extensions of this invention.

The reference numeral 10 indicates generally a lift truck similar to that shown in our earlier U.S. Pat. Nos. 3,826,393 and 3,908,849 to Carroll. The lift truck has a frame structure 11 supported by forwardly extending spaced apart ground engaging drive wheels 12 and 13. An arm 14 is hingedly mounted at its rear on the frame structure 11 and at its forward end the arm supports the drive wheel 12. Another arm 15 is hingedly mounted at its rear on the frame structure 11 and at its forward end this other arm supports the drive wheel 13. The arms 14 and 15 are arranged parallel to one another and are preferably moved in unison when vertical arcuate adjustment is desired. The rear of the lift truck 10 is supported by ground engaging caster wheels 16.

The front of the lift truck 10 is provided with spaced apart vertically disposed mast members 17 and 18. A shield 19 covers the tops of the parallel mast members 17 and 18. An operator's seat is carried on the frame structure 11 between the front and rear wheels as shown at 20. An operator 21 sits on the seat 20 during the operation of the lift truck of this invention. A shielding frame 22 is provided over and behind the operator to give the operator safety protection.

A transversely disposed carriage 23 is mounted on the mast members 17 and 18 for vertical movement thereon. Chains 24 and 25 cooperate with the masts 17 and 18 and with the carriage 23 to effect either power up or power down movement of the carriage relative to the masts. A first L-shaped member 26 is mounted on the carriage 23 and a second L-shaped member 27 is mounted in a spaced apart position on the carriage 23. The L-shaped member 26 has a vertical leg 28 which abuts and is attached to the forward face of the carriage 23. The L-shaped member 26 includes a forwardly extending generally horizontally disposed leg 29 which constitutes the regular fork or tine of the lift truck 10. The similar L-shaped member 27 also has a vertical leg 30 which abuts and is attached to the forward face of the carriage 23 at a spaced apart position from the attachment of the L-shaped member 26. The L-shaped member 27 also includes a forwardly extending generally horizontally disposed leg 31 which constitutes the regular fork or tine of the lift truck 10. Together the forwardly extending spaced apart forks 29 and 31 act in conjunction with one another and are used to lift loads vertically relative to the masts 17 and 18.

Figure 2:
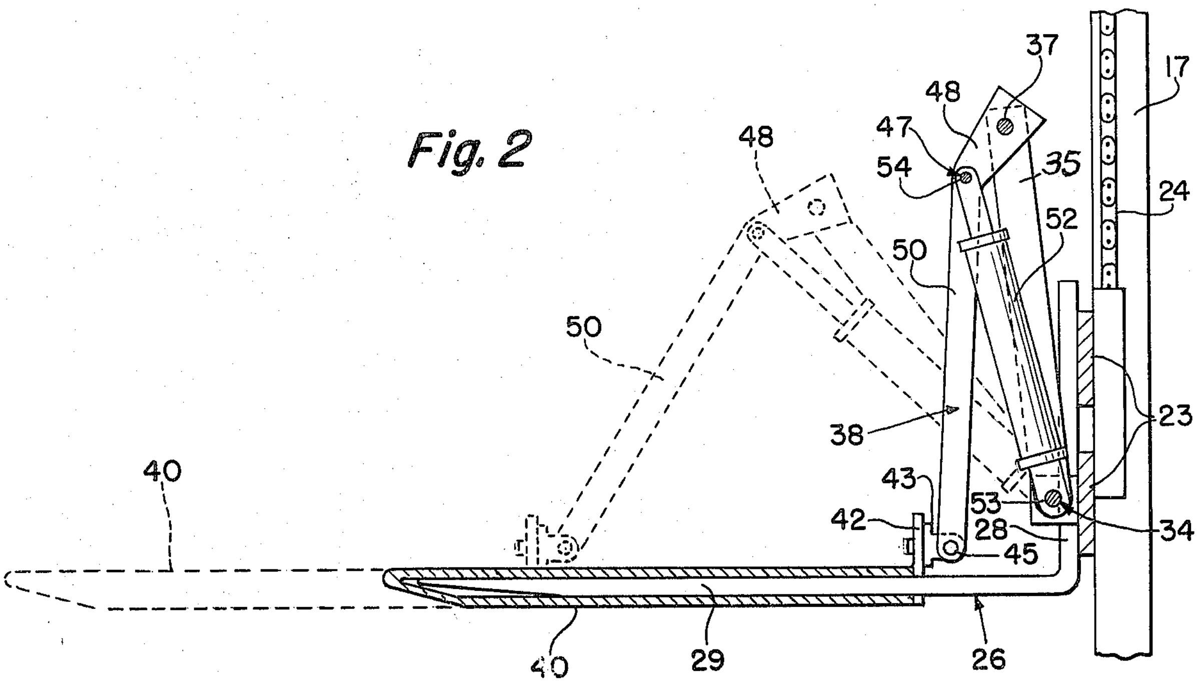
FIG. 2 is a sectional view taken generally on the line 2—2 of FIG. 1 and showing the mechanical linkage utilized to extend and retract the sleeve fork extensions.
Figure 3:
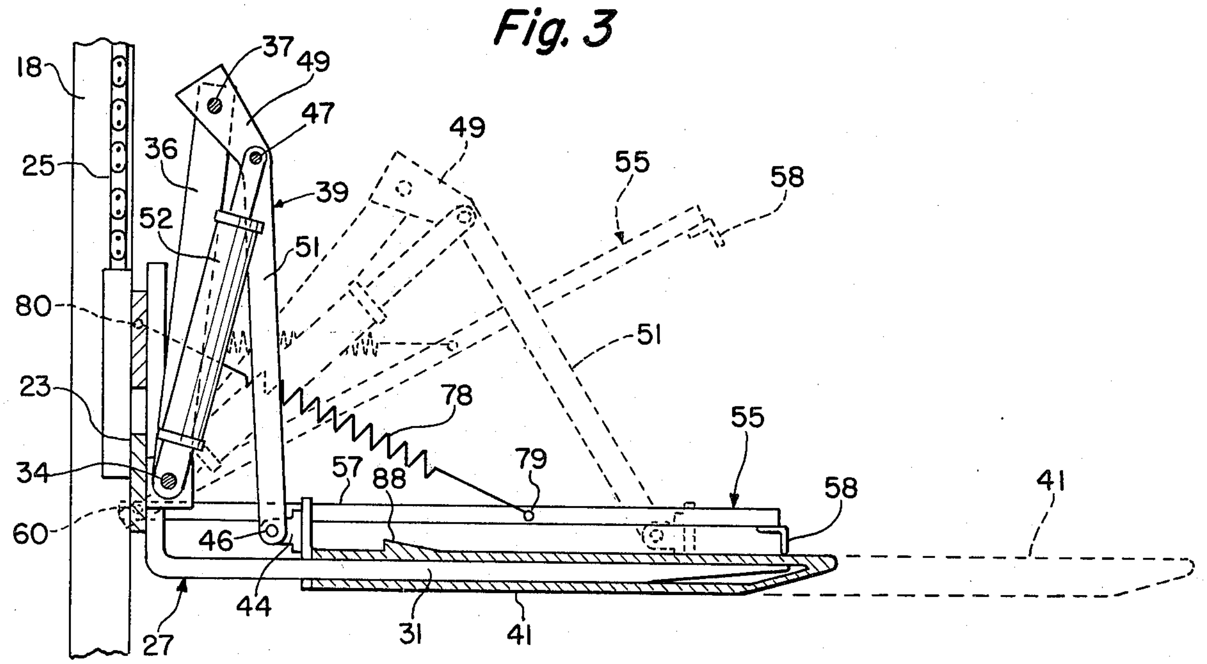
FIG. 3 is a sectional view taken on the line 3—3 of FIG. 4 and showing the other side of the forks and their mechanical linkage operating mechanism of FIG. 2 and further including the load stripping bail member.
Figure 4:
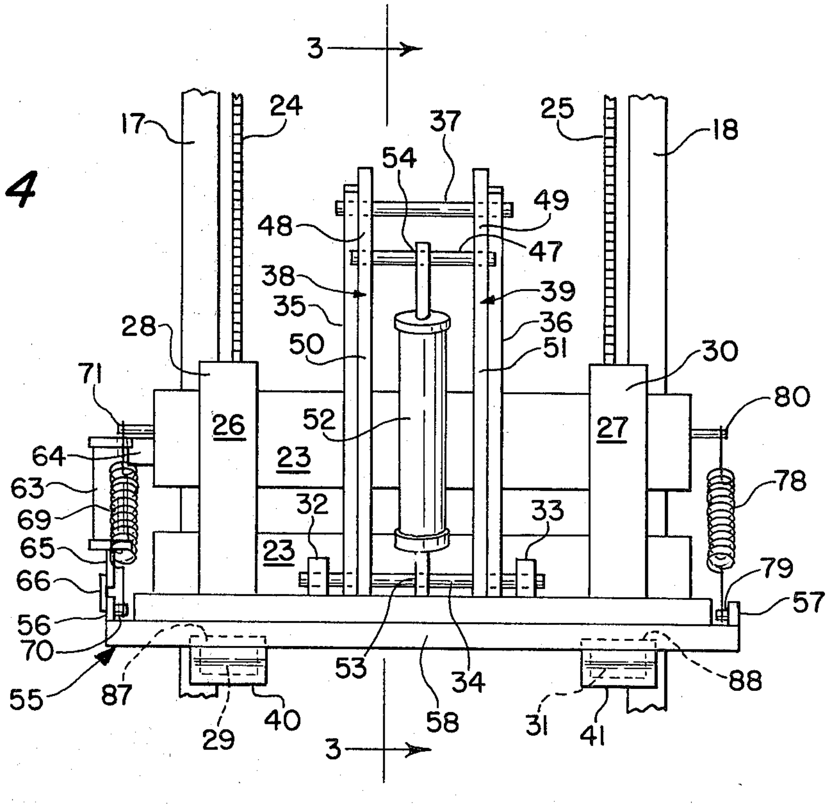
FIG. 4 is a front elevational view of the lift truck's lifting forks with their extension powering mechanism and including the load stripping bail member.

As best shown in FIGS. 2, 3 and 4 a vertically disposed lug 32 is welded on the front side of the carriage 23. A spaced apart lug 33 is similarly welded on the front of the carriage 23 and is disposed generally parallel to the lug 32. These spaced apart lugs 32 and 33 support a transversely disposed shaft 34 on which the fork extension linkage of this invention is mounted. Spaced apart link arms 35 and 36 are pivotally mounted at their lower ends on the transverse shaft 34 and extend generally upwardly therefrom. A cross shaft 37 is mounted in and through the upper ends of the spaced, parallel links 35 and 36. Spaced apart bell crank lever links 38 and 39 are pivotally mounted at their upper ends on the cross shaft 37.

A sleeve extension 40 is provided over the regular fork tine 29. Similarly a sleeve extension 41 is provided over the regular fork tine 31. The sleeves 40 and 41 are adapted to slide fore and aft on the regular forks to thereby extend or retract them in telescopic fashion. A cross tie member 42 is fixedly attached to the rear ends of both sleeve extensions 40 and 41 to thereby adjoin the sleeves and make them unitary for power movement. A first ear or lug 43 is welded or otherwise fastened to the rear of the cross member 42. A spaced apart ear or lug 44 is similarly welded or otherwise attached to the cross tie member 42. It is to these ears 43 and 44 that the lower ends of the bell crank lever links 38 and 39 are attached. The link 38 is pivotally attached to the ear 43 at 45 and the link 39 is pivotally attached to the ear 44 at 46.

Another cross shaft 47 joins the parallel bell crank lever links 38 and 39 intermediate their ends. The position of this cross shaft 47 defines upper portions 48 and 49 respectively of the links 38 and 39. Similarly the cross shaft 47 defines angularly disposed lower portions 50 and 51 of each of the links 38 and 39. A hydraulically operable cylinder 52 is pivotally carried at 53 on the transverse shaft 34 at its lower end and is pivotally carried at its upper end at 54 on the cross shaft 47. The cylinder 52 is a two way cylinder in which a piston within the cylinder can be pushed one way or the other as desired to thus increase or decrease the overall length of the cylinder and its connecting rods to their pivotal attachments at 53 and 54. As best illustrated in FIG. 2 the cylinder 52 is at its shortest length in the full line showing thereof. In this position the sleeve extensions for the fork tines are withdrawn to the point where the sleeves are substantially coextensive with the length of the regular forks of the lift truck. However, when the cylinder 52 is expanded as shown by the dash lines of FIG. 2 the linkage is shifted causing the bellcrank lever links 38 and 39 to push the sleeve extensions 40 and 41 forwardly relative to the regular forks 29 and 31. Conversely when the cylinder is made shorter the sleeve extensions are retracted or telescoped back onto the regular forks as shown in the full lines of FIG. 2.

A bail-like member 55 is equipped with spaced apart parallel sides 56 and 57 and a front cross piece 58 as depicted in FIGS. 3, 4, 5 and 6. It is this bail member 55 that is utilized to effect the stripping of pallets of their loads. The bail arm 56 is pivotally mounted at 59 on the vertically adjustable carriage 23 of the lift truck. Similarly the other side arm 57 is pivotally mounted at 60 on the vertically movable carriage 23, but spaced from the pivot attachment 59. The arm 56 has a portion 61 extending rearwardly from the pivot mounting 59.

A power operator 63 is provided with a supporting arm 64 which is affixed to the vertically movable carriage 23. The power operator is utilized to effect the raising and/or lowering of the bail member 55. A piston-rod-like element 65 projects downwardly from the power operator 63 and at its lower end is pivotally attached to a short connecting link 66 at 67. The lower end of the connecting link 66 is pivotally attached at 68 to the rearward extension 61 of the bail side arm 56. A spring 69 has one end attached at 70 to the bail arm 56 intermediate its ends. The other end of the spring 69 is attached at 71 to the carriage 23 of the lift truck. Another spring 78 has one of its ends attached at 79 to the bail arm 57 intermediate its ends. The other end of the spring 78 is attached at 80 to the carriage 23. It is the purpose of the springs 69 and 78 to act as a counterbalance and to aid in the raising of the bail to its upright position.

The generally rectangular perimeter bail member 55 is capable of swinging from a generally vertical position downwardly through an arc to a generally horizontal position. The power operator may be powered by electricity, hydraulics, or air pressure to extend to retract its piston-like element 65. When this element is extended the linkage is such as to cause the bail 55 to swing upwardly. This upward movement is aided by the counterbalancing springs 69 and 78. Conversely when the piston-like element is retracted the bail is swung downwardly.

In the lift truck of this invention it is preferable to pick up a loaded pallet with the sleeve extensions at the very minimum of their forward extension. This tends to insure vehicle stability. The closer the load is to the center of gravity of the vehicle, the more tip-proof the vehicle becomes. When it is necessary to reach for a loaded pallet, for example, across to a far part of a truck bed, then the fork sleeve extensions are fully extended and inserted beneath the pallet. At that position the forks are raised just enough to clear the surface of the truck bed and the extended forks are then withdrawn or telescoped back onto the regular forks before the lift truck is backed away from the truck bed being unloaded. Thus, when the forks are extended any tipping of the lift truck would be minimal as the truck bed would be immediately underneath to stop any fall or tipping.

Figure 5:
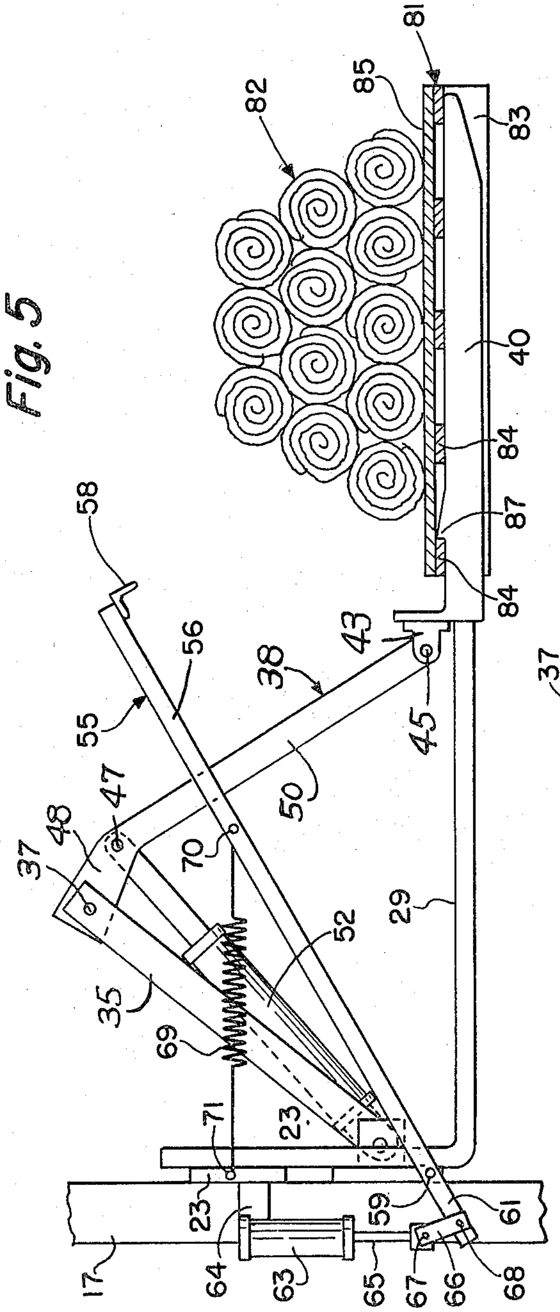
FIG. 5 is a side elevational view similar to the sectional view of FIG. 3 with the fork sleeves extended and carrying a loaded pallet thereon.
Figure 6:
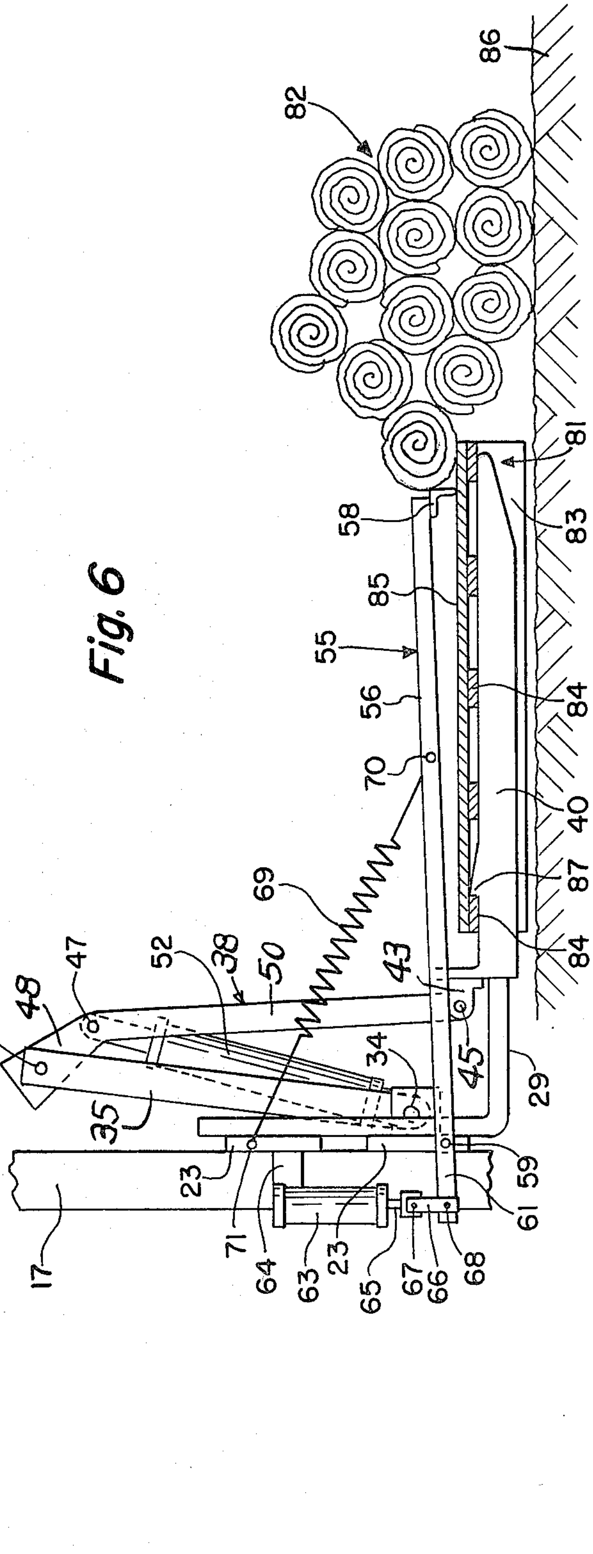
FIG. 6 is another side elevational view comparable to FIGS. 3 and 5 and showing the pallet load just having been stripped from the pallet.

Let us assume the lift truck has picked up a pallet 81 with a load 82 thereon. As shown in FIGS. 5 and 6 the pallet is constructed with a pair of longitudinally extending floor or ground engaging side rails 83. These spaced apart rails 83 are joined by transversely disposed and longitudinally spaced apart cross slats 84. In this particular pallet the cross slats 84 are covered with a smooth top plate 85.

After the loaded pallet has been removed from some location, such as a truck bed, it is lowered to the level of the unloading site which is usually the ground 86. Now, as shown in FIG. 5 the forks are again extended their maximum distance forwardly. If it is desired to immediately unload the pallet, the power operator 63 is actuated causing a lowering of the bail member 55. The side arms of the bail member are sufficiently long so that the front cross member 58 rests on the inner edge of the pallet 81 when the forks are fully extended.

An upward projection or stop member 87 is provided on the surface of the fork extension 40. Similarly another upward projection or stop member 88 is provided on the surface of the fork extension 41. The stops 87 and 88 are in transverse alignment and project upwardly into the space between the cross slats 84. Both stops have a vertical surface at their inner ends which preferably abuttingly engage the first cross slat 84 of the pallet 81. The forward ends of the stops 87 and 88 are bevelled to permit the extension forks 40 and 41 to slide beneath the first cross slat 84 of the pallet and get into position so the rear vertical edges abut the forward edge of the first cross slat 84 as shown. These stop members 87 and 88 interlock with the pallet 81 and act to hold the pallet on the lift forks.

In the load stripping operation the bail cross member 58 is lowered so that it rests on the top smooth surface 85 of the pallet 81 and the front vertical surface of the member 58 abuts the rear of the load 82 carried by the pallet. Now, when the extended forks are retracted as shown in FIG. 6 the bail cross member 58 acts as a holder to cause the load to be forced onto the ground 86 while the pallet is slid out from beneath the load. It is thus possible for loaded pallets to be stripped of their loads at the time of unloading and the empty pallets returned to the shipper immediately after delivery.

The device of this invention has the feature of power operated fork extensions with a particular mechanical linkage and hydraulic cylinder means to effect the powered forward extension and/or the powered rearward sliding of the fork extension sleeves. Another feature of the device is the pallet load stripping means which includes the powered swingable bail member 55 in combination with the fork extension means as described herein.

I am aware that numerous details of construction may be changed without departing from the principles disclosed herein and I therefore do not propose limiting the patent granted hereon otherwise than as necessitated by the appended claims.

What is claimed is:

1. Power operated fork extensions for a lift truck in which a pair of forwardly projecting regular conventional forks mounted on a carriage are capable of being raised and lowered relative to a vertical mast, comprising a sleeve telescopically engaging each of the regular conventional forks of the lift truck, said sleeves constituting members which convert the conventional load carrying regular conventional forks to extensible load carrying members, a cross member fixedly adjoining the sleeves at their rearward ends, said carriage having a pair of spaced apart lugs, a transverse shaft supported in said spaced apart lugs, a pair of laterally spaced apart links journally supported at their lower ends on said transverse shaft, a cross shaft joining the upper ends of said pair of links, a pair of laterally spaced apart bell-crank lever links pivotally mounted at their upper ends on said cross shaft, said cross member having a pair of spaced apart lugs on its rear surface, said pair of bell-crank lever links pivotally mounted at their lower ends to the spaced apart lugs on the cross member, said bell-crank lever links each having an upper portion and an angularly disposed lower portion, a rod affixed between said bell-crank lever links at the juncture between the upper and lower portions, an extensible and retractable hydraulic cylinder having its upper end pivotally mounted on said rod between said bell-crank lever links and having its lower end pivotally mounted on said transverse shaft, whereby when the hydraulic cylinder is extended the bell-crank lever links act to push or extend the sleeve extensions forwardly and when the hydraulic cylinder is shortened the bell-crank lever links act to retract the sleeve extensions.

* * * * *